(12) United States Patent
Taylor

(10) Patent No.: US 10,715,872 B2
(45) Date of Patent: *Jul. 14, 2020

(54) MEDIA SHARING AND COMMUNICATION SYSTEM

(71) Applicant: David A. Taylor, Sterling Heights, MI (US)

(72) Inventor: David A. Taylor, Sterling Heights, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/683,347

(22) Filed: Nov. 14, 2019

(65) Prior Publication Data

US 2020/0084514 A1    Mar. 12, 2020

Related U.S. Application Data

(63) Continuation-in-part of application No. 16/032,612, filed on Jul. 11, 2018, which is a continuation-in-part (Continued)

(51) Int. Cl.
| | | |
|---|---|---|
| *H04N 21/4788* | (2011.01) | |
| *H04N 21/258* | (2011.01) | |
| *H04N 21/433* | (2011.01) | |
| *H04N 21/81* | (2011.01) | |
| *H04N 21/478* | (2011.01) | |

(Continued)

(52) U.S. Cl.
CPC ..... *H04N 21/4788* (2013.01); *H04N 21/2187* (2013.01); *H04N 21/25875* (2013.01); *H04N 21/4334* (2013.01); *H04N 21/4532* (2013.01); *H04N 21/47815* (2013.01); *H04N 21/812* (2013.01)

(58) Field of Classification Search
CPC .......... H04N 21/4788; H04N 21/4334; H04N 21/47815; H04N 21/25875; H04N 21/2187; H04N 21/812; H04N 21/4532

See application file for complete search history.

(56) References Cited

U.S. PATENT DOCUMENTS

| 10,368,122 B2 * | 7/2019 | Taylor | H04N 21/632 |
|---|---|---|---|
| 2009/0228938 A1 * | 9/2009 | White | H04N 7/17318 |
| | | | 725/87 |

(Continued)

*Primary Examiner* — Junior O Mendoza

(74) *Attorney, Agent, or Firm* — Kohn & Associates, PLLC

(57) ABSTRACT

A media sharing and communication system, including a recording mechanism that records a desired portion of media upon activation by a first individual user, a first user transmitter/receiver that transmits the portion of media and a voice message generated by the first individual user regarding the portion of media to a second individual user and is capable of transmitting a message to a second individual user during a live program, a confirmation mechanism that confirms that the second individual user is authorized to view the portion of media and a notification mechanism that notifies the first individual user if the second individual user is not authorized to receive the portion of media, and a second user transmitter/receiver that receives the portion of media and voice message upon authorization of the second individual user. A method of sharing portions of media and watching a live program.

14 Claims, 5 Drawing Sheets

Related U.S. Application Data of application No. 13/937,001, filed on Jul. 8, 2013, now Pat. No. 10,368,122.

(60) Provisional application No. 61/773,518, filed on Mar. 6, 2013.

(51) Int. Cl.
*H04N 21/45* (2011.01)
*H04N 21/2187* (2011.01)

(56) References Cited

U.S. PATENT DOCUMENTS

| | | | | |
|---|---|---|---|---|
| 2011/0179439 A1* | 7/2011 | Elbarky | H04N 7/17318 | 725/25 |
| 2012/0311633 A1* | 12/2012 | Mandrekar | H04N 5/445 | 725/40 |
| 2013/0247101 A1* | 9/2013 | Uchida | H04N 21/4223 | 725/40 |
| 2014/0082645 A1* | 3/2014 | Stern | H04N 21/454 | 725/13 |
| 2018/0324496 A1* | 11/2018 | Taylor | H04N 21/632 | |

* cited by examiner

MEDIA SHARING AND COMMUNICATION SYSTEM

BACKGROUND OF THE INVENTION

1. Technical Field

The present invention relates to generally to media sharing and communication systems and methods of providing the same.

2. Background Art

Individuals having common bonds, both men and women, congregate together to watch events such as sports, theater, or otherwise. In one particular aspect, it is common for individuals to watch television programming including movies, sports, politics, or otherwise. This may occur in a public setting, such as bars, or in a private setting, such as one's home. During these programming events, individuals engage in discussions, exchange of ideas or beliefs, cheering or even badgering one another.

With the expansion in relationships between individuals, it is not always possible for individuals to participate in viewing events or programming together. This is particularly the case after individuals separate over time, such as after military service, college, or otherwise. However, recently it has become more common for individuals to maintain long distance relationships with one another. To this extent, various internet service providers have offered networking and communication systems between individuals. They provide the ability to send public and private messages to others in their networking group. They also provide the ability to share profiles and preferences with one another so as to exchange information. Examples of such networking systems include FACEBOOK®, LINKEDIN®, TWITTER®, or otherwise.

However, while these and other networking means have provided some means for individuals to maintain contact, they do not effectively replace the ability for individuals to interact with one another, particularly when it comes to events and more particularly with television programming.

In view of the foregoing, there is a need for systems and methods to allow individuals to continue to enjoy events and programming together, without having to be at the same location. This allows for expanded networking in different aspects than before.

SUMMARY OF THE INVENTION

The present invention provides for a media sharing and communication system, consisting of a recording mechanism that records a desired portion of media upon activation by a first individual user who is not a content provider, the portion of media being less than a full media episode; a friend request mechanism for sending and receiving friend requests between users to be approved to receive and share media and wherein the friend request mechanism suggests friends who have similar interests of the first individual user; a first user transmitter/receiver included in a first user system that transmits the portion of media and a message generated by the first individual user regarding the portion of media to a second individual user who is not a content provider, the first user system including a first user interface having an input device and screen view that is generated by software stored on a memory device of the first user transmitter/receiver, the first user system including a user profile generator interface, the first user transmitter/receiver further capable of transmitting a message to a second individual user during a live program; a confirmation mechanism that confirms that the second individual user is authorized to view the portion of media and a notification mechanism that notifies the first individual user if the second individual user is not authorized to receive the portion of media and notifies the second individual user that the portion of media cannot be received due to programming configuration subscribed to by the second individual user; and a second user transmitter/receiver included in a second user system that receives the portion of media upon authorization of the second individual user; the second user system including a second user interface having an input device and screen view that is generated by software stored on a memory device of the second user transmitter/receiver, the second user system including a user profile generator interface, and the second user transmitter/receiver further capable of transmitting a message to a first individual user during a live program.

The present invention also provides for a method of sharing portions of media and watching a live program, by a first individual user recording a portion of media and recording a message, transmitting the portion of media and message to a second individual user if the second individual user is authorized to view the portion of media, the second individual user viewing the portion of media and message, the first individual user recording a message during a live program and transmitting the message to the second individual user, and the second individual user recording a message during the live program and transmitting the message to the first individual user.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

The present invention generally provides systems and methods for sharing and exchanging media between individuals with a media sharing and communication system 10, shown in the FIGURES. The exchange of media can be based on known interests of others.

"Individual" as defined herein, refers to an individual user of media, and not a media content provider or company.

"Media" as used herein, refers preferably to a short portion of media, or a clip i.e. less than a whole video, movie, television show, song, etc. However, full portions of media can also be shared. Also, screenshots of media can be shared.

Advancements through the features of the present invention provide a TUBEMAIL™, TUBESHARE™, YOUSHARE™, communication system that allows individual users, who share the same cable or satellite provider, the ability to record and share portions or full episodes of sporting events, movies, shows, or otherwise along with messages regarding the media.

Figure 1:
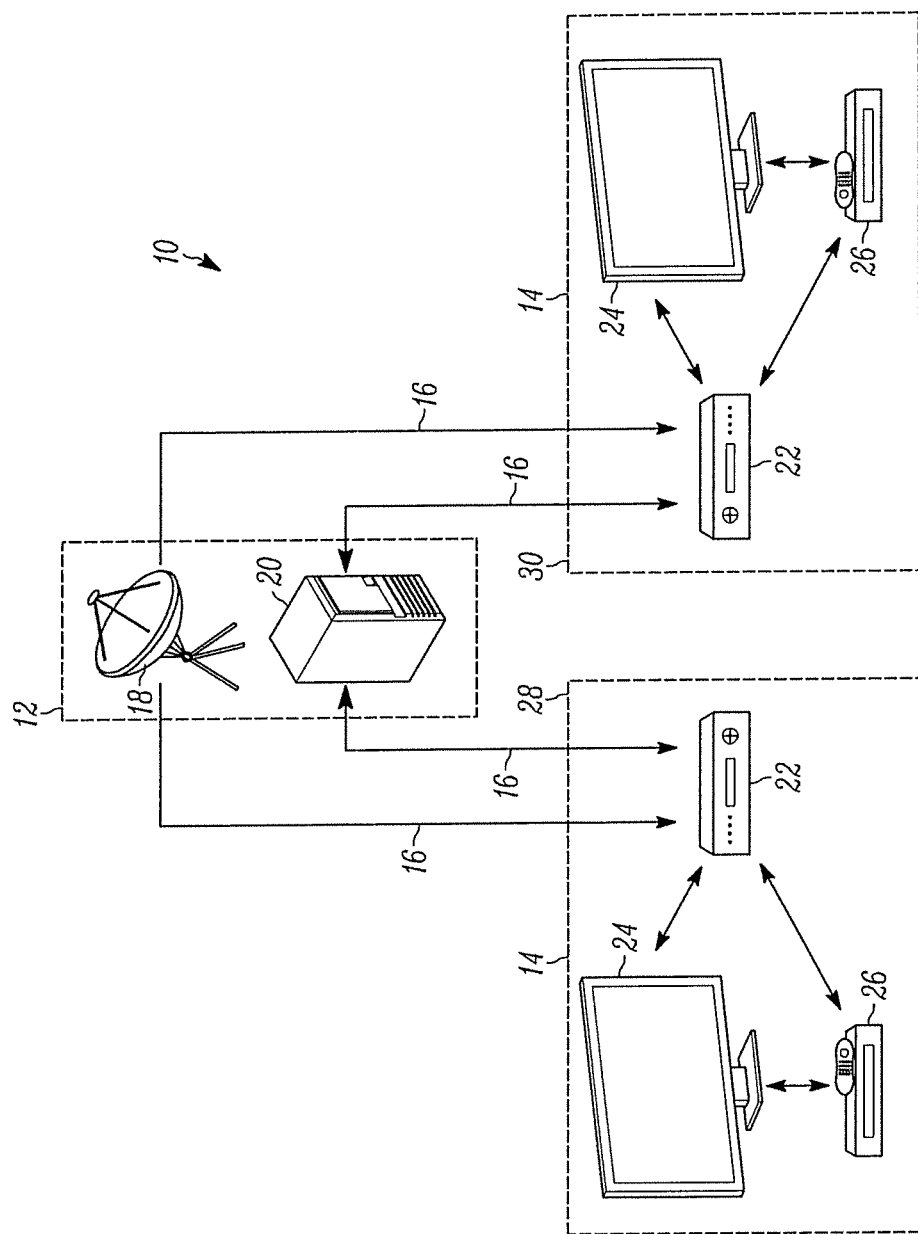
FIG. 1 illustrate a schematic view of a media sharing and communication system according to the teachings of the present invention.

Referring to FIG. 1, an exemplary embodiment of a media sharing and communication system 10 is shown. The system 10 includes a media content provider 12 configured to provide media content to a plurality of user systems 14 over one or more networks 16. The system 10 includes a transmitter 18 configured to transmit media, particularly media programming, to the user systems 14 over the one or more networks 16. The system 10 further includes a receiver 20 configured to receive media, or media information including identification information, from the user systems 14, over the one or more networks 16. The plurality of user systems 14 are configured to receive media, such as television programming, from the media content provider 12. In one exemplary embodiment, the user systems 14 include a user transmitter/receiver 22, in communication with the media content provider, a display screen 24 for viewing media content received by the user transmitter/receiver, and in one particular exemplary embodiment a digital recording device 26 for recording digital information received by the transmitter/receiver 18. In one particular configuration, the user transmitter/receiver 22 is further configured for transmitting data stored by the digital recording device 26.

In one exemplary mode of operation, digital media is transmitted or streamed by the media content provider 12 to the plurality of user systems 14. The media transmitted by the media content provider 12 may comprise any media transmitted by a network including programming shows, movies, sporting events, or otherwise. The transmitted media is received by the user systems 14 through the one or more networks 16. The media received by the user transmitter/receiver 22 is further transmitted to the display screen 24 for viewing. During viewing, once the individual user of the user system 14 determines they wish to share media content, the digital recording device 26 is activated to record the desired media or record information pertaining to the desired media. The media can also be stored and saved on non-transitory computer readable medium on the digital recording device 26 for sharing at a later time by the user. The digital recording device 26 can also copy the media for storage for a limited time instead of recording. The individual user of the user system 14 generates a message (which can be a text message, a voice commentary message, information related to the location of the media, or combinations thereof) and the recorded media or record information pertaining to the desired media along with the message is then transmitted to another user system 14 (i.e. a second user system 14), via the network 16, through the user transmitter/receiver 22. Dissemination of media from one user system 14 to another user system 14 may be based upon selection by an individual user of the first user system 14, based upon user profile set up by an individual user of the first or second user system 14, or otherwise. In other words, the media can be selectively distributed to individual users based on their preferences, including an indication of desired media content. Once the recorded media or media information is received by the second user system 14, the second individual user selectively reviews the message and views the media. In case the first individual user does not send a message along with the portion of media, the second individual user can initiate dialogue with the first individual user and send a message to the first individual user. For example, if the first individual user sends a clip from a TV show without a message, and the second individual user is confused as to why they received the clip, they can send a message to the first individual user to ask them why the clip was sent. The first individual user can send messages either to a second individual user alone, or to a group of individual users that the first individual user can select to share the message with. When sent to a group, this functions as a group chat.

In greater detail, with reference to FIGS. 1-4, the media content provider 12 is configured for disseminating media to a plurality of user systems 14. In one exemplary embodiment, the media content provider 12 comprises a cable television provider, satellite television provider, online movie or other media provider, or otherwise. The media content provider 12 provides assortment of media including audio/visual media, identification information or otherwise. The media provides one or more, or plurality of programming for the user systems 14. Examples of programming available through the media, without limitation, includes movies, network programming, sporting events, concerts, or otherwise. The media disseminated to the user systems 14 may be streamed through or stored on local hard drive of the media content provider 12.

The transmitter 18 of the media content provider 12 is configured to disseminate media to a plurality of user systems 14 over one or more networks 16. In one configuration, the network comprises a hardwired network, such as a cable network extending from the media content provider 12 to the user systems 14. In another configuration, the network comprises or includes a wireless network configured for broadcasting signals through radio waves or otherwise. In the latter configuration the media content provider 12 includes a satellite dish or other means for broadcasting media. It is contemplated that the media disseminated from the media content provider 12 may be streamed through the media content provider or stored on one or more digital recording device. Any user transmitter 18 or receiver 20 can include wireless communication links for receiving media and media content providers 12 can disseminate media through wireless communication links.

The receiver 20 of the media content provider is configured to receive information from the user systems 14. In one configuration, the receiver 20 records data transmitted by the user systems including media, program information, both or otherwise. Accordingly, in view of the many potential user systems 14, it is contemplated that the receiver 20 includes many data storage devices. In another configuration, the receiver 20 is further configured for transmitting the received or recorded media to another user system 14, according to a request by the originating user system 14.

Figure 2:
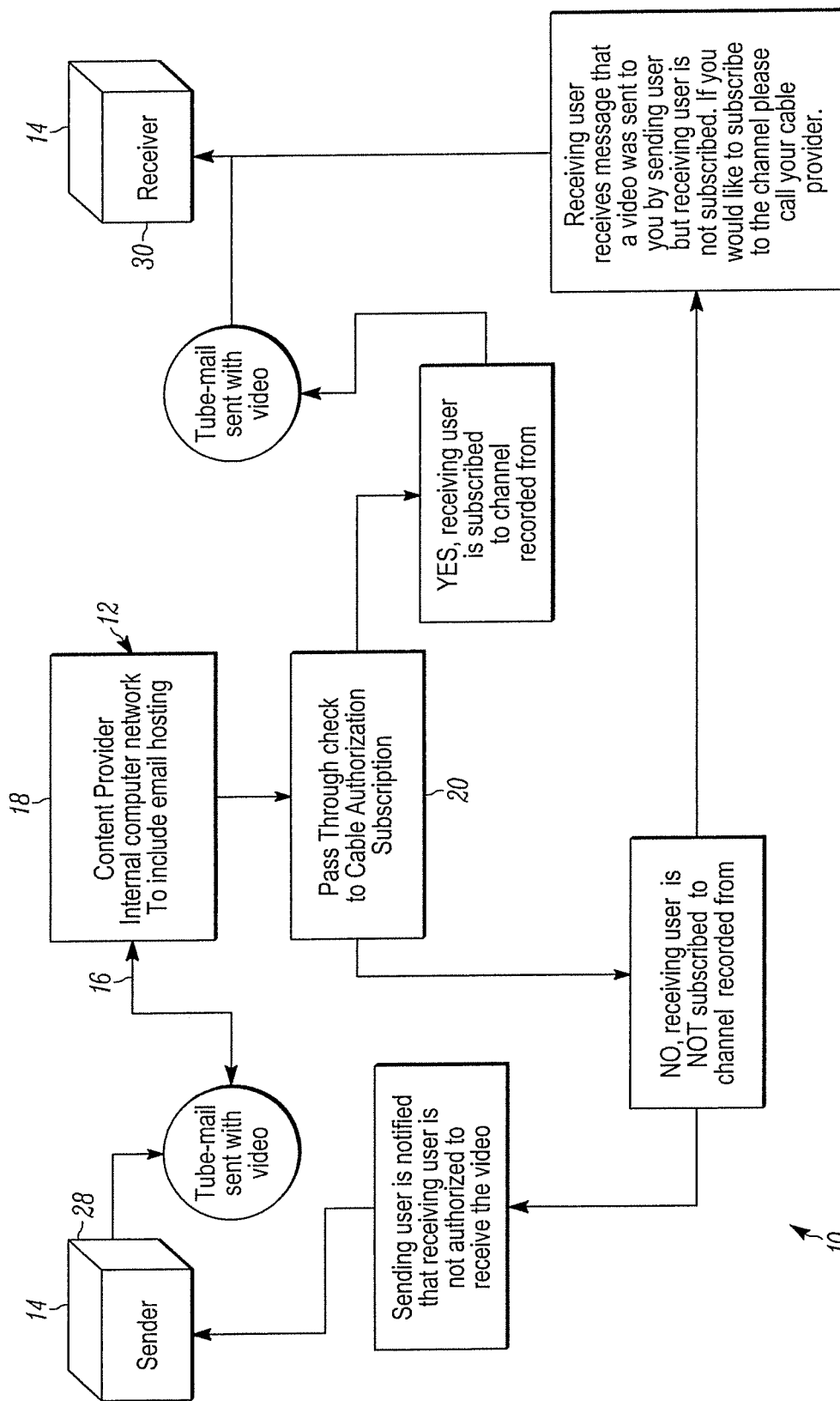
FIG. 2 illustrates a schematic view of another media sharing and communication system according to the teachings of the present invention.
Figure 3:
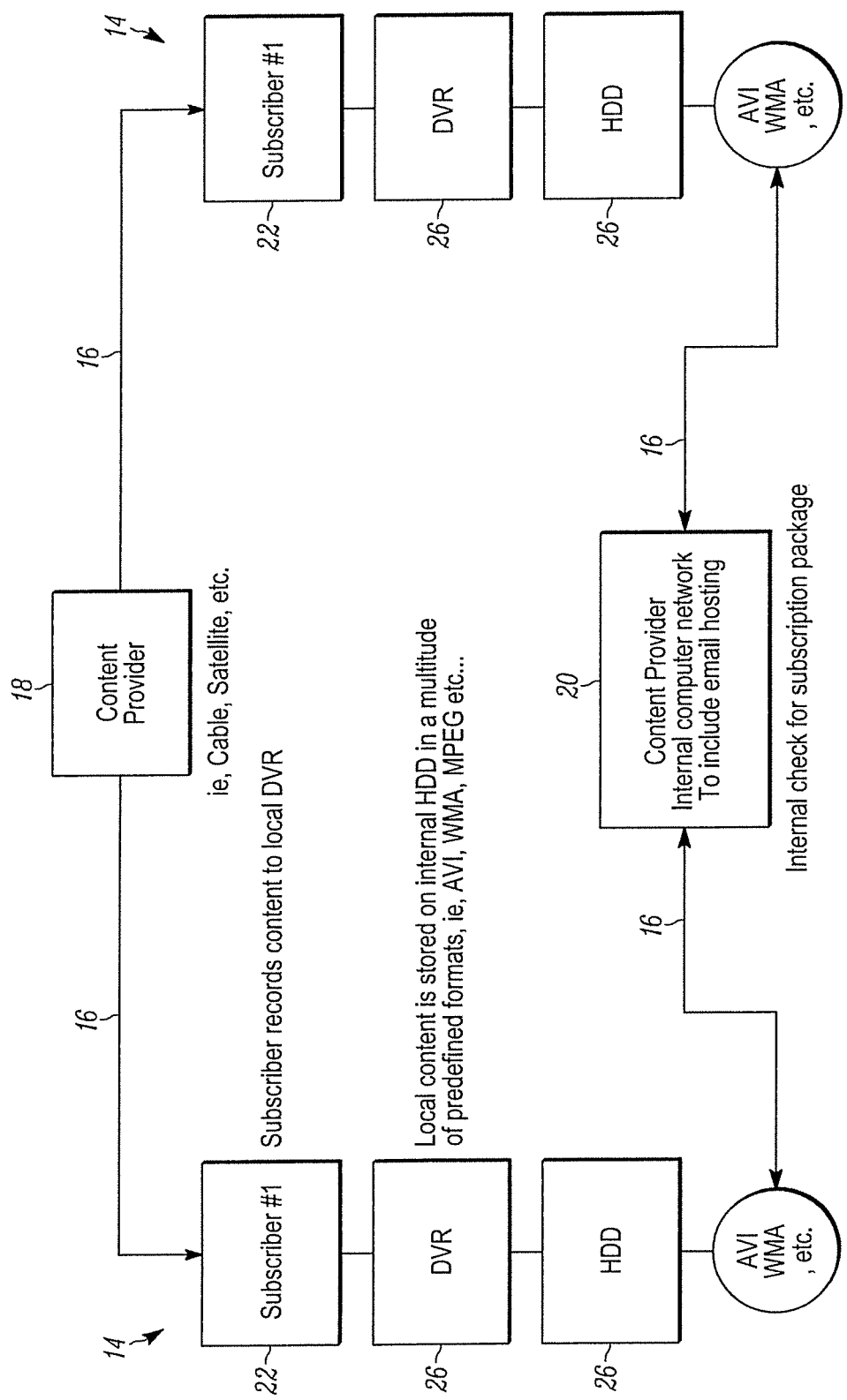
FIG. 3 illustrates a schematic view of another media sharing and communication system according to the teachings of the present invention.
Figure 4:
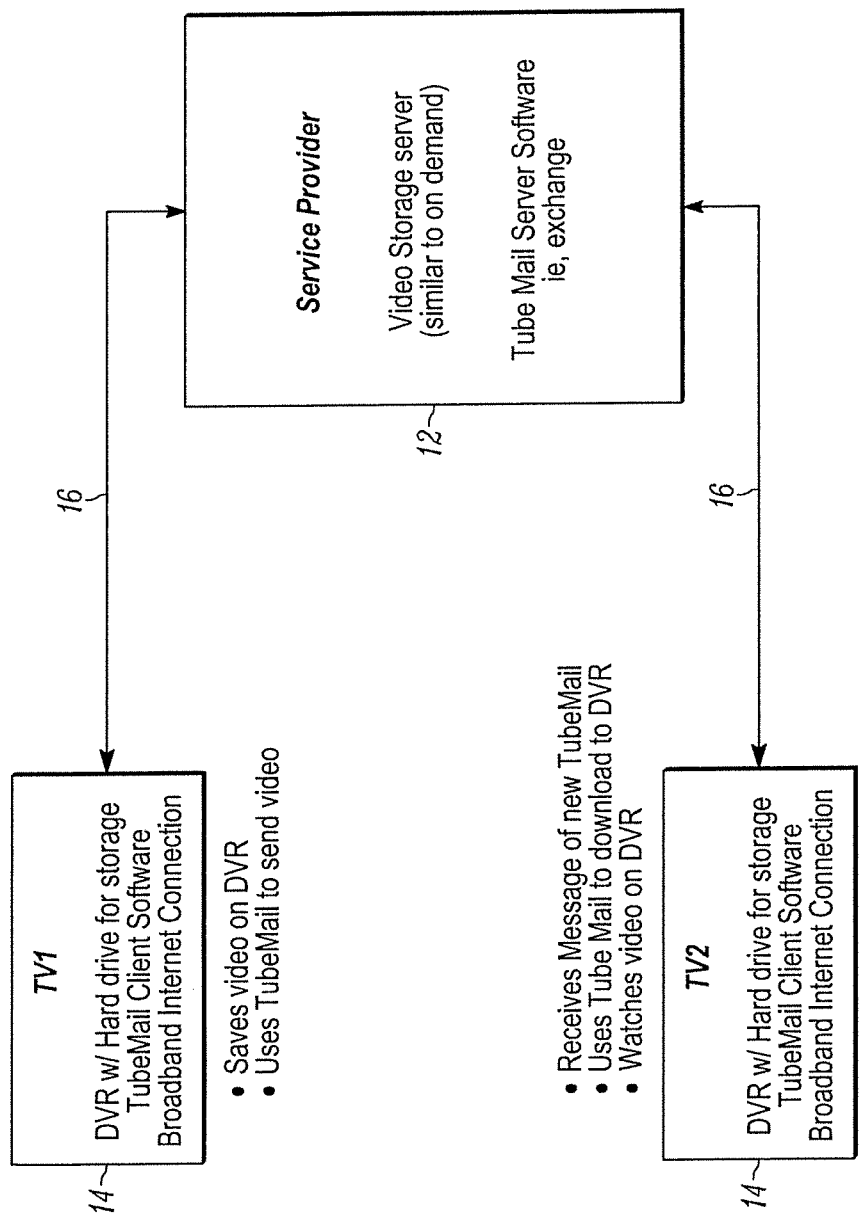
FIG. 4 illustrates a schematic view of another media sharing and communication system according to the teachings of the present invention.

In one particular exemplary embodiment, referring to FIG. 2, the receiver 20 is configured with suitable software for reviewing media transmitted by a user system. In this configuration, it is possible for the receiver 20 to review the identification information of the media transmitted by a first user system 28 and confirm that a designated second user system 30 is authorized to receive the media. In this configuration, the receiver 20 confirms that the media transmitted by the first user system 28 is viewable by the second user system 30 through the viewing package held by the second user system. For example, should the first user system 28 transmit media from a first channel the receiver 20 confirms that the second user system 30 is authorized to view media on the first channel. Should the programming subscribed by the second user system 30 include the first channel then the second user system is authorized to receive and view the media along with any communication attached therewith. Should the programming purchased by the second user system 30 not include the first channel then the second user system is notified that media could not be received due to programming configuration subscribed by the second user. Also, the first user system 28 is notified that the second user system 30 is not authorized to receive the media due to programming subscription of the second user system.

Referring again to FIG. 1, the user system 14, e.g. first user system 28, second user system 30 or otherwise, include the user transmitter/receiver 22, which is configured to receive media from the media content provider 12 and in one particular exemplary embodiment transmit media and/or communication to the media content provider 12 and another user system 14. In one exemplary embodiment, the user transmitter/receiver 22 is similar or includes a cable box, satellite receiver or similar devise commonly used to receive broadcasted digital programming. It should be appreciated that the transmitter/receiver 22 may comprise a single unit or several units.

The user system 14 further include display screen 24 configured to display media received by the user transmitter/receiver 22. The display screen comprises any suitable display screen including standard definition televisions, high definition televisions, monitors or otherwise. The display screen 24 is in communication with the transmitter/receiver 22 through suitable connecting cables or otherwise. The user systems 14 further includes digital recording device 26 configured to record media received by the user transmitter/receiver 22. Examples of suitable digital recording devices 26 includes DVRs or otherwise. The digital recording device 26 is in communication with the transmitter/receiver 22 through suitable connecting cables or otherwise.

Figure 5:
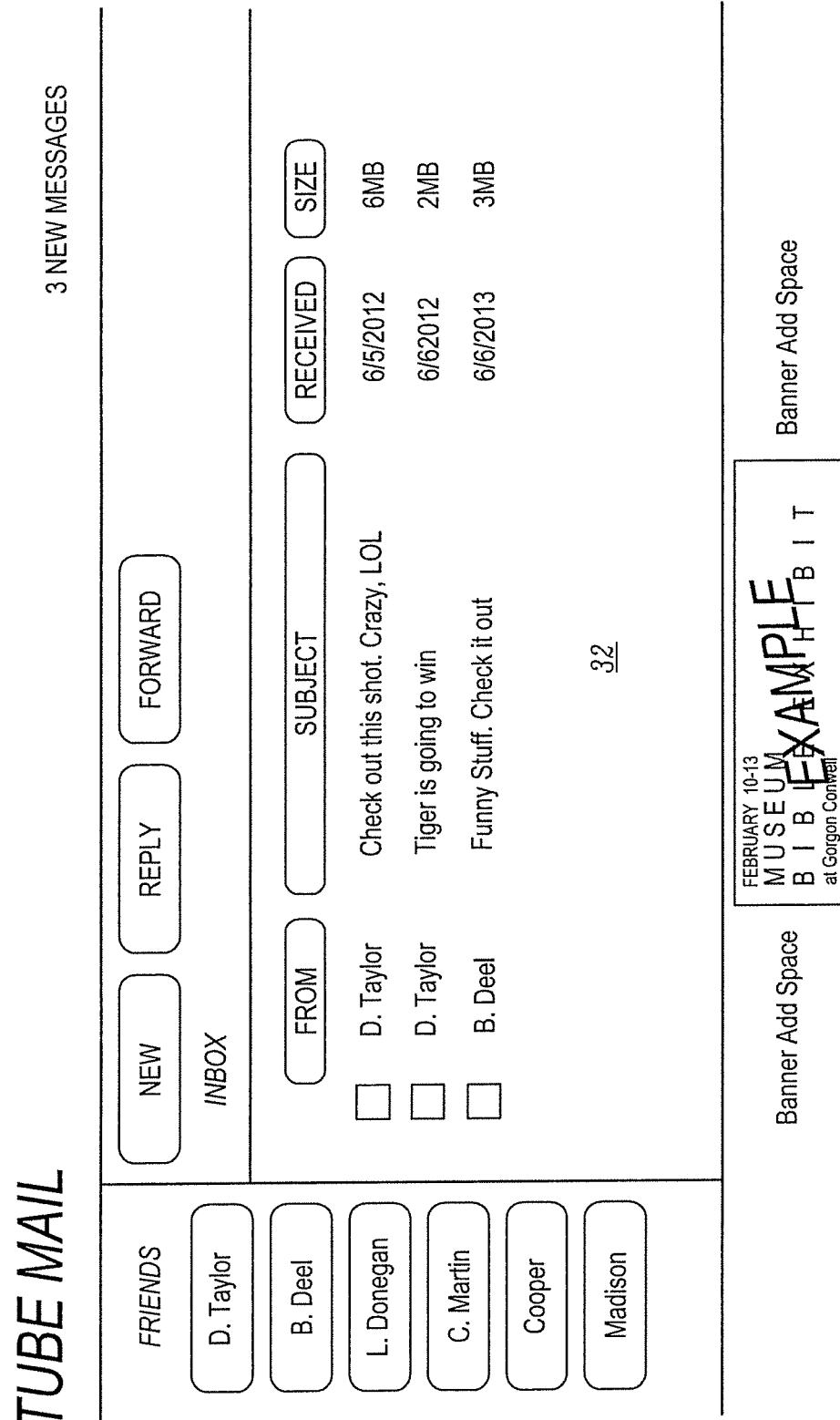
FIG. 5 illustrates a screen-shot of an exemplary user interface according to the teachings of the present invention.

Referring to FIGS. 1 and 5, the user systems 14 further include suitable software for generation of a user interface 32 that is useable with a remote keypad, mouse and/or other user interface devices. In one exemplary embodiment, the suitable software for generating the user interface 32 is stored on a memory device of the user transmitter/receiver 22. In the configuration shown in FIG. 5, the user interface 32 provides means for composing messages (whether text or voice) and attaching media segments, e.g. audio, video and/or identification information, to the composed message. The completed communication is then sendable to other user systems 14. An instant messaging exchange can be located across the bottom of the user interface 32. In the configuration shown, the user interface 32 includes a 'FRIENDS' section indicating users of other user systems 14. The user interface 32 further includes 'NEW', 'REPLY' and 'FORWARD' icons for creating, responding and forwarding communications, which may include media. The user interface 32 further includes 'INBOX' section listing communication received from other user systems 14 including 'FROM', communication or media 'SUBJECT', date 'RECEIVED', and file 'SIZE' In one exemplary embodiment, the user interface 32 includes 'Banner Add Space' for displaying relevant marketing or advertising to the user of the user system, which may be based upon a user profile (including age, gender, location, interests such as favorite television shows, actresses or actors, sport teams, soap operas, musician, band, celebrity commercials or otherwise), transmitted or received media and/or communication, or otherwise.

The user interface 32 can also include a store section wherein users can shop for products directly from their user system 14. The store section can include products that are directly advertised to the user as above, or products that may be of interest to the user based on their user profile (i.e. targeted to the user based on things that they like or are following their profile). The store section can include links to products on outside websites, such that when the user clicks on the item, they are directed to an outside website to complete the purchase. The store section can also receive meta data (or other data tagged with information) from programs that the user is watching that generates links to products shown in the program so that the user can purchase the products. The program can automatically push this data to the user system 14. For example, if the user is watching "The View", and they like the reading glasses that a co-host is wearing, a link can be generated for those glasses that the user can click on and buy the glasses. Users can also gift products to other users in the system. For example, users can gift a streaming package or digital gift cards to other users. Gift cards can be added to the other user's user profile for purchasing media content or other products that they desire. Users can also gift products (such as those advertised based on the other user's profile) and have them shipped to another user.

In one exemplary embodiment the user system 14 includes suitable software and user interface 32 for generating a user profile and attract other users or followers from social networks such as FACEBOOK®, TWITTER®, or otherwise, based upon the type of programming the user views. The user profile includes information of an individual user of the user system 14 to provide an indication of personal preference. For example, information that can be inputted into the user interface includes types of media, e.g. audio, video or identification information that a user enjoys. Other user preferences includes programming likes and dislikes including sports, movies, programming, celebrities, commercials, or otherwise. Other user preferences are possible.

In greater detail, in one exemplary embodiment, the user profile provides the ability to indicate special interests. In one particular configuration, the user profile is used to generate suggested viewing. The user profile provides the ability of a user to indicate particular interests which may include a particular actor, athlete, programming type or otherwise. Based upon the user profile, the media sharing and communication system 10 generates a listing of program based upon the user programming, which may include similar interest such as indicated actors, athletes, programming type or otherwise. Traditional methods require the user to search for something and then they begin to see advertisements directed towards their search. The present invention reverses this process.

For example, should the user profile indicates a favorite baseball player and the particular baseball player is participating in an interview on one programming channel, such as a finance channel, the system 10 would indicate to the user that a player indicated in their user profile is on a particular channel providing the ability of the user to watch or record the particular programming. This concept can also be applied to actors, movie types, sports, other players, automobile manufactures or otherwise.

The user profile as visible in user interface 32 can further include tabs for trending news, sports, products, clips of media. The user can add particular news sources, sports teams, or products they are interested in, and/or these can be generated based on information in the user profile.

The communication system 10 provides socialization between users. The individual user of the user system 14 can send and receive a friend request, which must be approved by the recipient (i.e. second user system 14), in order to be added to the friend list and receive media. The communication system 10 is further configured to suggest friends or other users that have similar interest so that media can be sent to individuals, of a user profile friend list, that has similar interests. The communication system 10 further provides the ability to set up a notification that will notify a user when other users are online or offline.

In one particular exemplary embodiment, the user system 14 is integrated in hardware and/or software components of a cellular phone. For example, the transmitter/receiver 22 comprises a transmitter/receiver 22 used in cellular phones for cellular communication. The display screen 24 comprises a screen and user interface of the cellular phone. Further, the cellular phone includes a digital recording device comprising a memory module for recording media, generating user interfaces, generating messages, combinations thereof or otherwise.

In one particular mode of operation, referring again to FIGS. 1-5, during viewing of media being disseminated from the media content provider 12, should the viewer find a particular media content of interest, the user records and initiates the user interface 32 to select other users to which to share the media content with. Optionally, the user includes a message with the recorded media, such as "check this out", "did you see that play", "best part of the movie", or otherwise. The recorded media and message is sent to another user system 14, through the media content provider 12 and more specifically receiver 20. Should the recipient be authorized to receive the media and have sufficient memory, the message and media is transferred to the second user system 14.

In particular, when the message is a voice commentary, this allows the users (whether sending or receiving) to narrate clips or portions of media and to have open dialogue about particular clips of interest. This can allow the user the opportunity to act as a news anchor or sports commentator. Voice commentary allows the user to express with great detail what that media portion means to them along with why they decided to send it to a particular user. This can enhance the television viewing experience with friends and family when users are in two different households, and gives the user an opportunity to explain to the other user why they feel they should or should not like a show, actor, sports team, etc. With the voice commentary, the user can also talk over a desired portion of media, much like a sports commentator or news anchor, and narrate the portion of media.

The present invention creates excitement for the user when a user turns on their user system 14, and is notified that they have messages in their INBOX from friends and family as in FIG. 5. The present invention helps reduce channel surfing, because when a user turns on their user system 14, they have suggested media to review from their INBOX, as well as suggestions for media to view based on their likes and interests from their user profile, such as an actress they like is on a talk show at a certain time, or their favorite sports team is playing on a particular channel.

Users can further send messages to other users without a media file attached with it. For example, a user can send another user a reminder that a program they like was on earlier, or simply send messages not related to media files such as greetings to another user. Users can also message each other while watching a live program, and this provides users the ability to watch a program together while being in different locations. Messages can pop up on their display screen 24 of their user system 14, or go directly to their INBOX while watching a live program.

The present invention also provides for a method of sharing portions of media and watching a live program, by a first individual user recording a portion of media and recording a message (such as video, text, voice, or combinations thereof), transmitting the portion of media and message to a second individual user if the second individual user is authorized to view the portion of media, the second individual user viewing the portion of media and message, the first individual user recording a message during a live program and transmitting the message to the second individual user, and the second individual user recording a message during the live program and transmitting the message to the first individual user. This method can be performed by using the media sharing and communications system 10 described above. More particularly, the recording step is further defined as the first individual user recording a portion of media with a recording mechanism 26 in a first user system 14, the transmitting step is further defined as transmitting the portion of media and message with a first user transmitter/receiver 22 to a second user transmitter/receiver 22, and the viewing step is further defined as a second individual user viewing the portion of media and message with a second user system 14. Any notifications described above can be sent to the first individual user or second individual user, such as notifying the first individual user if the second individual user is not authorized to view the portion of media. The users can create user profiles and the user systems 14 can generate suggested programming based on the user profile. The method can further include notifying the first (or second) individual user of messages in an inbox and suggestions of programming when the first (or second) user system 14 is turned on. The users can also shop in the store section of the user system 14.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A media sharing and communication system, consisting of:

a recording mechanism that records a desired portion of media upon activation by a first individual user who is not a content provider, the portion of media being less than a full media episode;

a friend request mechanism for sending and receiving friend requests between users to be approved to receive and share media and wherein the friend request mechanism suggests friends who have similar interests of the first individual user;

a first user transmitter/receiver included in a first user system that transmits the portion of media and a message generated by the first individual user regarding the portion of media to a second individual user who is not a content provider, the first user system including a first user interface having an input device and screen view that is generated by software stored on a memory device of the first user transmitter/receiver, the first user system including a user profile generator interface, the first user transmitter/receiver further capable of transmitting a message to a second individual user during a live program;

a confirmation mechanism that confirms that the second individual user is authorized to view the portion of media and a notification mechanism that notifies the first individual user if the second individual user is not authorized to receive the portion of media and notifies the second individual user that the portion of media cannot be received due to programming configuration subscribed to by the second individual user; and a second user transmitter/receiver included in a second user system that receives the portion of media upon authorization of the second individual user; the second user system including a second user interface having an input device and screen view that is generated by software stored on a memory device of the second user transmitter/receiver, the second user system including a user profile generator interface, and the second user transmitter/receiver further capable of transmitting a message to a first individual user during a live program.

2. The media sharing and communication system of claim 1, wherein the media is chosen from the group consisting of program information, programming shows, movies, concerts, and sporting events.

3. The media sharing and communication system of claim 1, wherein the second user transmitter/receiver includes a recording mechanism that records a desired portion of media upon activation by the second individual user and can transmit the portion of media to the first individual user.

4. The media sharing and communication system of claim 1, wherein the first user transmitter/receiver includes a wireless communication link.

5. The media sharing and communication system of claim 1, wherein a media content provider disseminates media through a communication link.

6. The media sharing and communication system of claim 1, wherein the first user interface transmits the portion of media to the second user transmitter/receiver based upon a profile established through a user interface of the second user transmitter/receiver.

7. The media sharing and communication system of claim 6, wherein the profile comprises select program or program type disseminated by a media content provider and personal information of the user of the first user transmitter/receiver.

8. The media sharing and communication system of claim 1, wherein the first user transmitter/receiver automatically records media disseminated by the media content provider based upon preferences entered into a user profile of the first user transmitter/receiver.

9. The media sharing and communication system of claim 1, wherein the notification mechanism notifies the first individual user, the second individual user, or both, if the second user transmitter/receiver does not have sufficient memory to receive the portion of media.

10. The media sharing and communication system of claim 1, wherein the first user transmitter/receiver, recording mechanism and first user interface are incorporated in a cellular phone.

11. The media sharing and communication system of claim 1, wherein the message is chosen from the group consisting of text, voice, and video.

12. The media sharing and communication system of claim 1, wherein the first user transmitter/receiver and second user transmitter/receiver are capable of sending messages without a media file.

13. The media sharing and communication system of claim 1, wherein the first user interface includes a store section for shopping for products.

14. The media sharing and communication system of claim 13, wherein the products are chosen from the group consisting of product directly advertised to the first individual user, products based on a user profile, products shown in a program, and combinations thereof.

* * * * *